July 13, 1954     A. J. ENGELMAN     2,683,324
FISHHOOK SPREADER
Filed Aug. 9, 1951
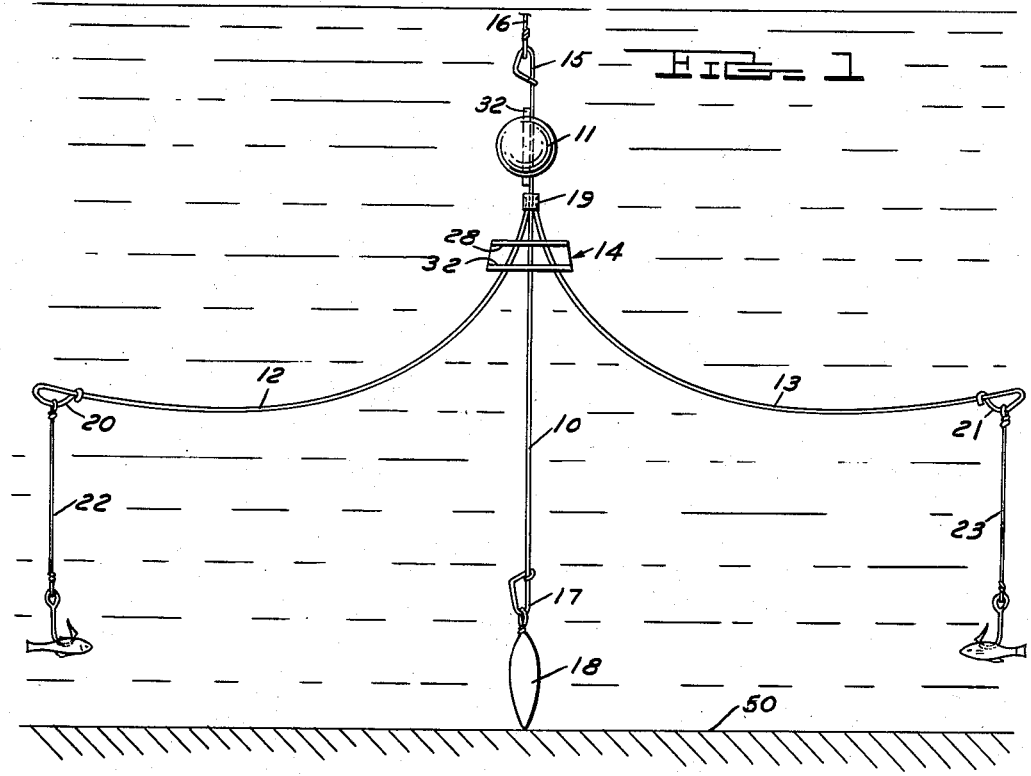
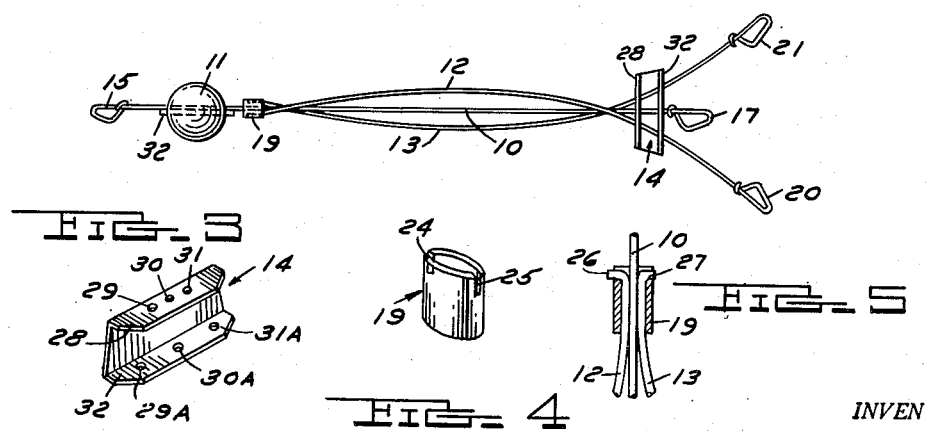
INVENTOR.
ALOYSIUS J. ENGELMAN
BY
ATTORNEY Patented July 13, 1954

2,683,324

UNITED STATES PATENT OFFICE 2,683,324

FISHHOOK SPREADER

Aloysius J. Engelman, Detroit, Mich.

Application August 9, 1951, Serial No. 241,063

5 Claims. (Cl. 43—42.74)

This invention relates to fish-hook spreader and in particular to improvements in a self-stabilizing and self-standing spreader.

Fish-hook spreaders have been employed heretofore to separate two hooks on a single line at the same depth; however the several devices of the prior art have not proven entirely satisfactory inasmuch as the prior spreaders tilt relative to the line and sinker so as to become tangled therewith and tend to tip over and fall down on the bottom of the lake or stream.

With the foregoing in view, the primary object of the present invention is to provide a fish-hook spreader with a float so that the device always stands straight up on the bottom in definite adjusted spaced relation thereto.

An object of the invention is to provide a substantially rigid center leg having a float at the top and a sinker attachment at the bottom so that the leg stands perpendicularly when submerged.

An object of the invention is to provide two side arms secured to the center leg below the float.

An object of the invention is to provide a slide member having relatively closely spaced leg and arm receiving apertures at the top and relatively widely spaced leg and arm receiving apertures at the bottom so as to project the arms outwardly of the leg in the up position and to compactly cross and recross the arms relative to the leg in the down position.

An object of the invention is to provide a spreader which can be compactly collapsed and easily adjusted to vary the spread of the arms as desired.

An object of the invention is to provide a closed clip to securely interconnect the leg and the arms and to interconnect the arms with each other.

These and other objects of the invention will become apparent by reference to the following description of a fish-hook spreader embodying the invention taken in connection with the accompanying drawing, in which:

Fig. 1 is a side elevational view of the spreader in spread submerged condition showing baited hooks in separated relationship.

Fig. 2 is a side elevational view of the spreader in collapsed condition for storing.

Fig. 3 is a perspective view of the slide showing the apertured positions.

Fig. 4 is a perspective view of the clip showing the arm elbow receiving notches; and Fig. 5 is a detail cross-sectional view of the clip, leg, arm, and elbow in integrated relationship.

Referring now to the drawing wherein like numerals refer to like and corresponding parts throughout the several views, the fish-hook spreader disclosed therein to illustrate the invention comprises a center leg 10, a float 11 adjacent the top of the leg 10, a pair of oppositely extending resilient spreader arms 12 and 13 attached to the leg 10 below the float 11, and a slide 14 movably mounted on the leg 10 and arms 12 and 13 so as to be capable of spreading or collapsing the arms 12 and 13 relative to the leg 10.

More particularly, the leg 10 is equipped with a line attaching loop 15 at its stop so as to attach the line 16 and a sinker attaching loop 17 at its bottom so as to attach the sinker 18. The arms 12 and 13 are respectively equipped with hook attaching loops 20 and 21 for attaching the hooks by means of leaders 22 and 23. The clip 19 is a closed loop equipped with side notches 24 and 25 for receiving the elbows 26 and 27 respectively of the arms 12 and 13. The slide member 14 comprises a top slide plate 28 having relatively close-spaced apertures 29, 30, and 31 and a preferably connected bottom slide plate 32 having relatively wide-spaced apertures 29A, 30A, and 31A. The apertures 30 and 30A are centrally vertically aligned and house the leg 10 in sliding relationship, whereas the apertures 29A and 31A are offset laterally from the apertures 29 and 31 respectively so as to project and support the arms 12 and 13 outwardly of the leg 10 when the slide 14 is in the up position. The float 11 is secured in position on the leg 10 by the wooden peg 32 which forces the leg 10 into frictional engagement with the body of the float 11.

The fishing line 16 is attached to the device via the loop 15 and a sinker 18 is attached to the device via the loop 17, and, as the loops 15 and 17 are on the opposite ends of the leg 10, the leg 10 is tensioned between the line 16 and the sinker 18. As the float 11 is secured on the leg 10 at the top thereof adjacent the loop 15, buoyancy of the float 11 causes the leg 10 to stand vertically upright on the bottom of the lake or stream with the sinker 18 contacting the bottom thereby positioning the device in spaced relationship immediately above the bottom. The clip 19 interconnects the arms 12 and 13 so that tension and thrust on the arms 12 and 13 is transmitted to and resisted by each other. It will be noted that the arms 12 and 13 are normally shaped as shown in Fig. 1 of shape retaining material such as heat treated piano wire and therefore resists being collapsed when the slide 14 is moved from the position of Fig. 1 to the position of Fig. 2. The added tension on the arms 12 and 13 is transferred to one another thereby relieving the leg 10 and the connection between the leg 10 and the clip 19 from any strain. In this connection it is important to note that the outwardly projecting elbows 26 and 27 respectively on the arms 12 and 13 contact the clip 19 in the notches 24 and 25 in the side walls thereof and provide means for resisting tension placed on the arms 12 and 13. It is also important to note that the elbows 26 and 27 accurately position the arms 12 and 13 so that their permanent bend directs them outwardly and upwardly of the leg 10 thereby preventing the arms 12 and 13 from twisting, turning, or otherwise moving out of position. The clip 19, leg 10, arms 12 and 13, and elbows 26 and 27, after being assembled are welded or soldered together so that their mechanical structure is thoroughly integrated and secured.

The slide 14 slides from the position seen in Fig. 1 to the position seen in Fig. 2 collapsing the arms 12 and 13 from the position seen in Fig. 1 to the position seen in Fig. 2 so that the permanent bend in the arms 12 and 13 causes them to cross adjacent the clip 19 and to recross adjacent the slide 14 when the slide 14 is positioned adjacent the sinker loop 17. Due to the fact that the apertures 30 and 30A are vertically aligned the slide 14 slides easily along the leg 10, and due to the fact that the apertures 29 and 29A are aligned at an angle from the vertical substantially equal the angulation of the normal bend in the arm 12, and due to the fact that the apertures 31 and 31A are aligned from the vertical and are angled to substantially equal angulation of the normal bend in the arm 13, the slide 14 easily moves from the position seen in Fig. 1 to the position seen in Fig. 2 with the arms sliding therethrough while maintaining a curvature therein.

When the slide 14 is in the up position, Fig. 1, the outwardly angulated alignment of the apertures 29 and 29A and 31 and 31A position and support the arms 12 and 13 in the extended position seen in Fig. 1 which is frictionally secured by the tension created at the slide 14. In this connection it is important to note that the continuous loop constructed of the clip 19 and the interconnection between slots 24 and 25 with the elbows 26 and 27 makes a stable connection directly between the arms 12 and 13 and relieves the leg 10 of stress which might otherwise be laid thereon.

When the fisherman desires to use the device he attaches same to his line and attaches a sinker 18 thereon of such weight as to preferably just overbalance in conjunction with the weight of the device the buoyancy of the float 11 so that when the device is placed in the water the sinker 18 pulls the device to the bottom whereupon the sinker touching the bottom, the buoyancy of the float 11 maintains the device in an upright position on a vertical line from the sinker 18 so that the arms 12 and 13 are similarly positioned thereby accurately locating the baited hooks 22 and 23 at the desired level above the bottom. By moving the slide 14 this relationship is adjustable. Due to the fact that the device stands upright independently of itself, there is no necessity for tight line fishing; also as the device self-locates itself relative to the bottom 50, there is no necessity for constantly checking hook position.

As the arms 12 and 13 and leg 10 are made of relatively stiff material, when a fish is taken on either hook connected with the leaders 22 or 23 the tension between the hook and the line 16 may place the connecting arm in a substantially straight line therebetween; this action automatically moving the leg 10 and the other arm out of position of interference of either the line or the fish.

Although but a single embodiment of the invention has been shown and described in detail, it is obvious that many changes may be made in the size, shape, detail, and arrangements of the elements of the invention within the scope of the appended claims.

I claim:

1. A fish hook spreader comprising a center leg, a float on said leg adjacent the top thereof, a clip on said leg below said float and having oppositely disposed notches in the top thereof, a pair of oppositely extending resilient spreader arms, each having its inner end seated in said clip and being provided at such end with an outwardly projecting elbow disposed in the corresponding notch in said clip to secure said arms against rotation and displacement, and a slide on said leg below said clip engaging said arms and movable longitudinally of said leg to vary the position of said arms relative to said leg, said slide in its top position acting to locate and support said arms in extended lateral position and in its down position acting to collapse said arms relative to said leg and to each other, said leg being adapted to carry a sinker at its bottom end whereby said float and sinker will cause the spreader to stand erect when submerged.

2. A fish hook spreader comprising a center leg, a clip on said leg adjacent one end thereof and having oppositely disposed notches in the top thereof, a pair of oppositely extending resilient spreader arms, each having its inner end seated in said clip and being provided at such end with an outwardly projecting elbow disposed in the corresponding notch in said clip to secure said arms against rotation and displacement, and a slide on said leg below said clip engaging said arms and movable longitudinally of said leg to vary the position of said arms relative to said leg, said slide in its top position acting to locate and support said arms in extended lateral position and in its down position acting to collapse said arms relative to said leg and to each other, said leg being adapted to carry a sinker at one end to submerge said spreader.

3. A fish hook spreader comprising a center leg, a clip on said leg adjacent one end thereof, a pair of oppositely extending resilient spreader arms, each of said spreader arms having its inner end seated in said clip, and a slide on said leg engaging said arms and movable longitudinally of said leg to vary the position of said arms relative to each other, said slide in one position acting to locate and support said arms in extended lateral position and in another position acting to collapse said arms relative to each other.

4. A fish hook spreader as set forth in claim 3 wherein said slide comprises a pair of connected plates, each of which is apertured for reception of said leg and said arms, the apertures of one of said pair of plates being more closely spaced than the apertures of the other of said pair of plates.

5. A fish hook spreader as set forth in claim 3 wherein said center leg is provided at said one end with a float and at the other end with a sinker, said float and said sinker acting to maintain said spreader in an upright position when submerged.

References Cited in the file of this patent

UNITED STATES PATENTS

| Number | Name | Date |
|---|---|---|
| 1,079,245 | Hornby | Nov. 18, 1913 |
| 1,352,979 | Lawrence | Sept. 14, 1920 |
| 1,603,293 | Pflueger | Oct. 19, 1926 |
| 1,720,287 | Moore | July 9, 1929 |
| 2,162,739 | Mindek, Jr. | June 20, 1939 |

FOREIGN PATENTS

| Number | Country | Date |
|---|---|---|
| 62,212 | Norway | Mar. 18, 1940 |